United States Patent [19]

Su

[11] 4,057,035

[45] Nov. 8, 1977

[54] INTERNAL COMBUSTION ENGINES

[76] Inventor: Cherng Yi Su, Rua Topazio 380, Aclimacao, Sao Paulo, S.P., Brazil

[21] Appl. No.: 666,142

[22] Filed: Mar. 11, 1976

[51] Int. Cl.$^2$ .................... F02B 53/00; F02B 55/14; F01C 1/08
[52] U.S. Cl. ................... 123/8.27; 418/196; 418/227
[58] Field of Search ............ 123/8.27, 8.31, 8.47; 418/196, 227

[56] References Cited

U.S. PATENT DOCUMENTS

| 926,641 | 6/1909 | Coffey et al. | 123/8.31 |
|---|---|---|---|
| 1,093,309 | 4/1914 | Bouret | 418/196 |
| 1,389,874 | 9/1921 | Johnson | 418/196 |
| 2,256,418 | 9/1941 | Switzer | 123/8.27 |
| 2,275,205 | 3/1942 | Straub | 123/8.27 |

FOREIGN PATENT DOCUMENTS

| 1,372,782 | 8/1964 | France | 123/8.27 |

*Primary Examiner*—John J. Vrablik
*Attorney, Agent, or Firm*—Steinberg & Blake

[57] ABSTRACT

An internal combustion engine wherein a rotor is turnable within a housing while having an outer periphery which defines a circular channel with an inner periphery of the housing, the rotor having a pair of diametrically opposed projections end surfaces of which fluid-tightly and slidably engage the inner periphery of the housing. At least a pair of rotary members are connected with the housing while having a sealed, fluid-tight engagement therewith, these rotary members extending into the channel between the inner periphery of the housing and the outer periphery of the rotor and having a fluid-tight engagement with the outer periphery of the rotor. The rotary members are respectively formed with pockets which receive the projections as each projection moves past each rotary member. One of the rotary members serves to control the flow of combustible fluid into the channel as well as the discharge of exhaust gas therefrom, while the other of the rotary members defines a combustion chamber with each projection during travel of the latter past this other rotary member.

7 Claims, 36 Drawing Figures

FIG. 2.

▓ INTAKE
▒ COMPRESSION
◨ POWER
▤ EXHAUST
⚡ IGNITION

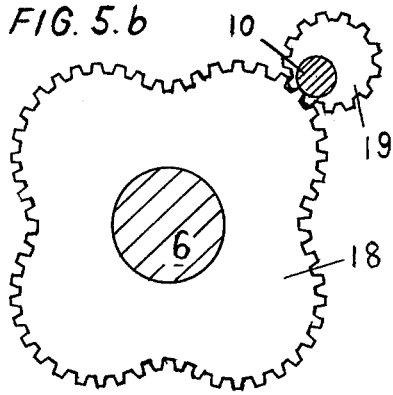
FIG. 5.b
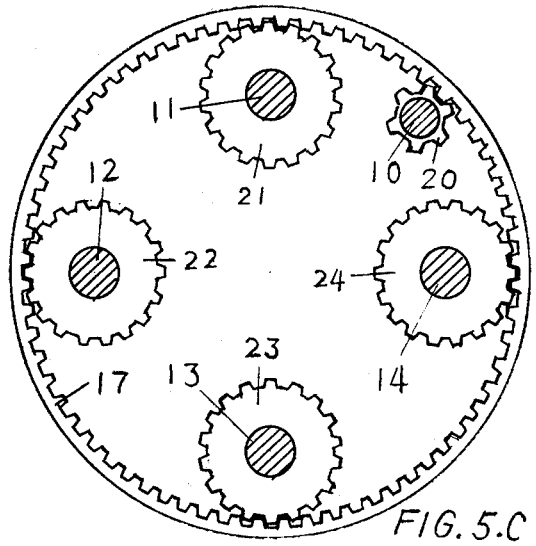
FIG. 5.C
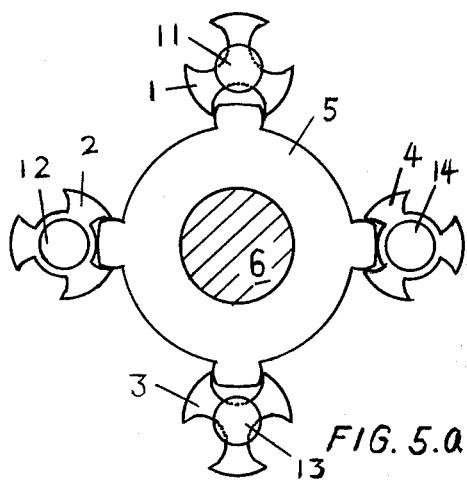
FIG. 5.a
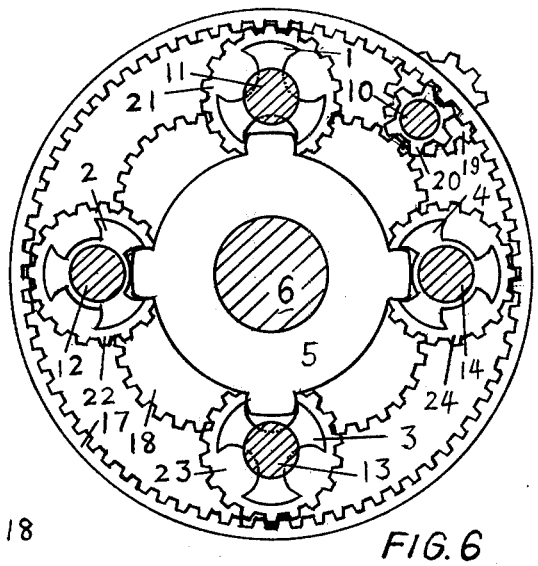
FIG. 6
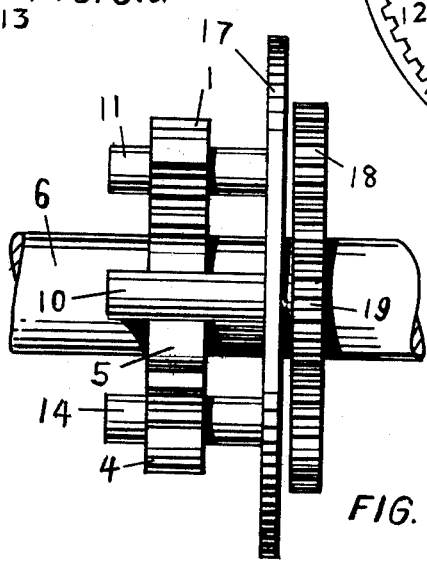
FIG. 7.

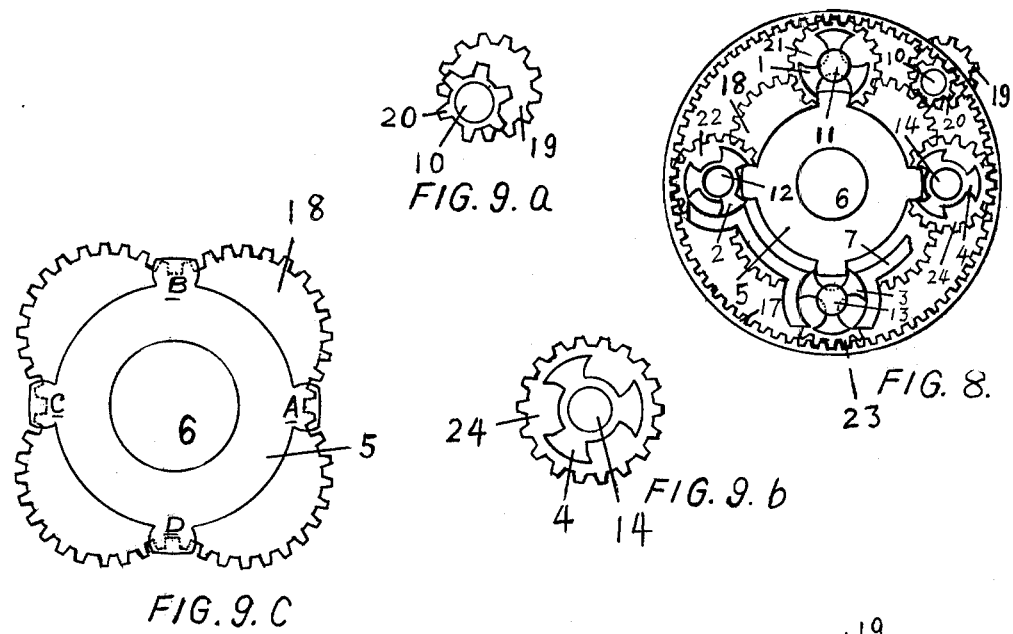
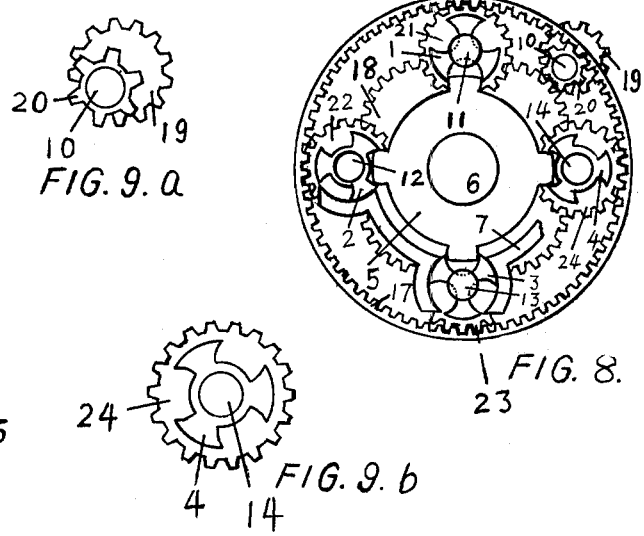
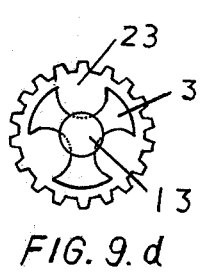
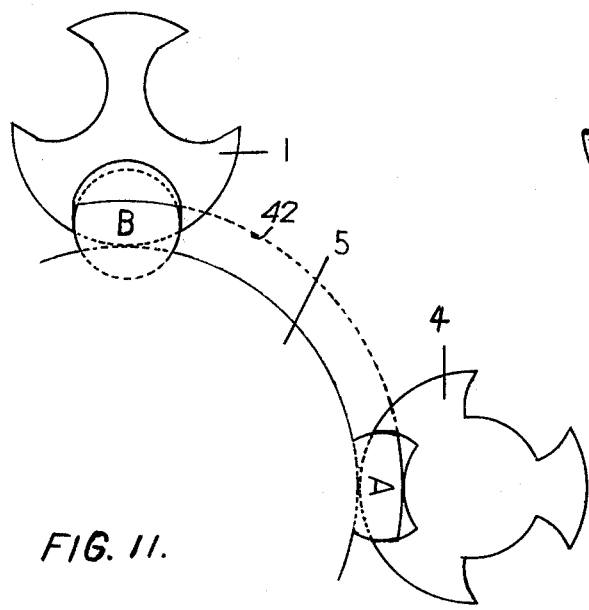
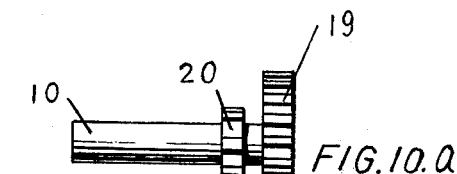
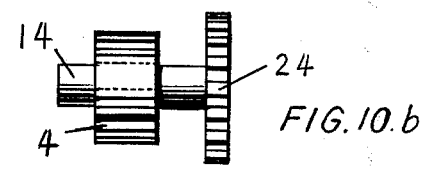
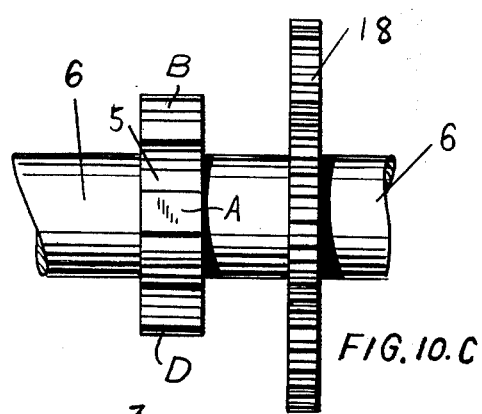
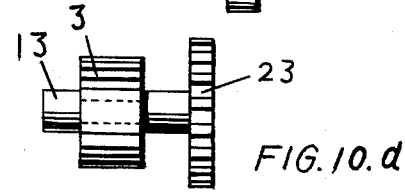

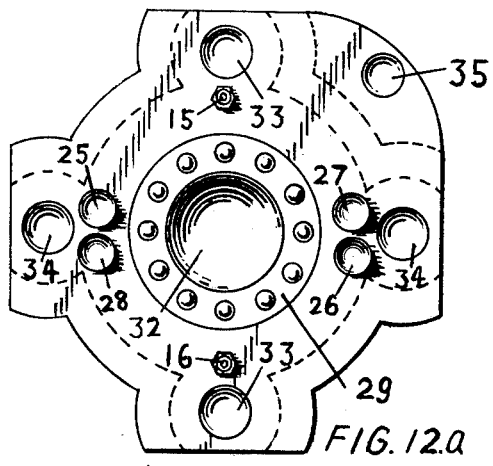
FIG.12.a
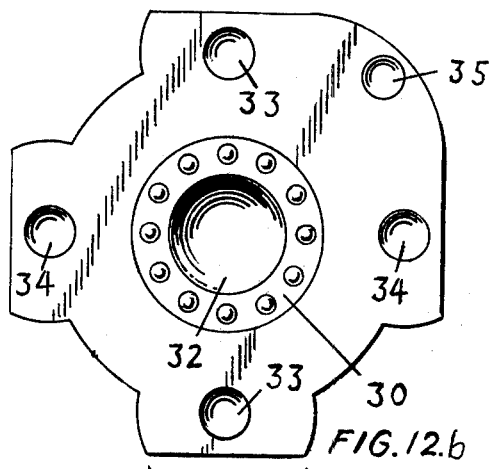
FIG.12.b
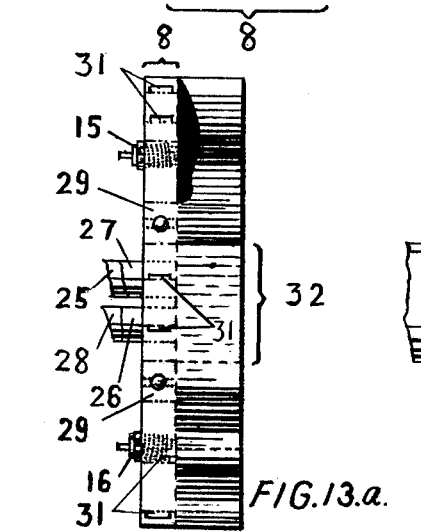
FIG.13.a.
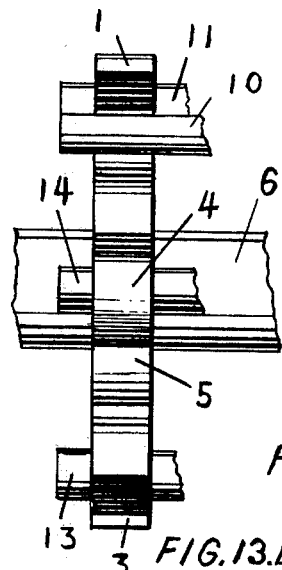
FIG.13.b.
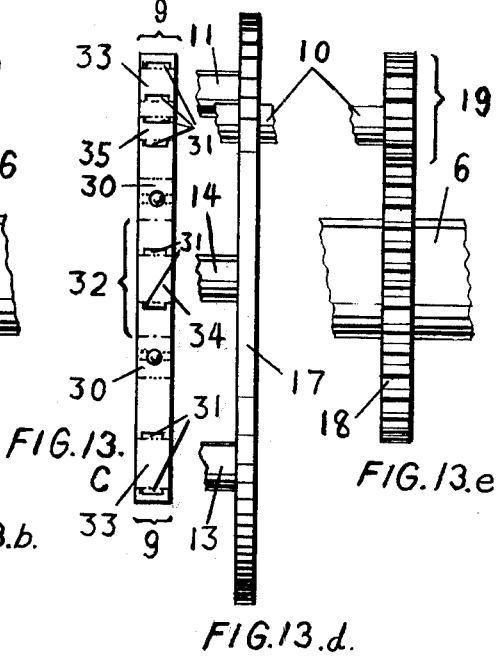
FIG.13.c
FIG.13.d.
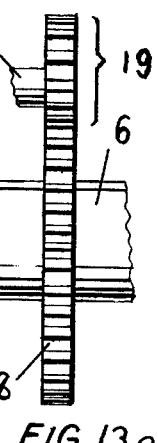
FIG.13.e
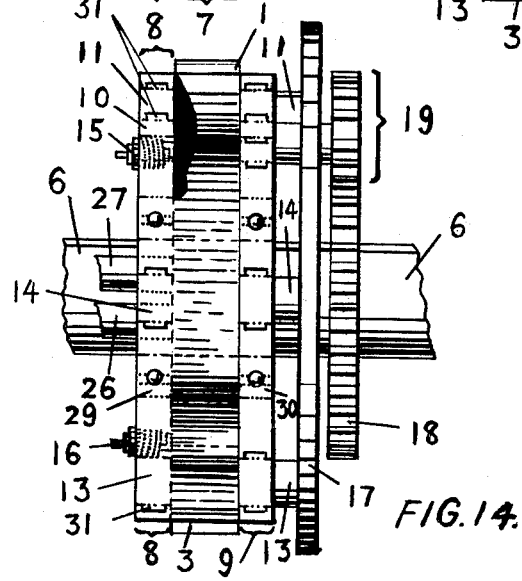
FIG.14.

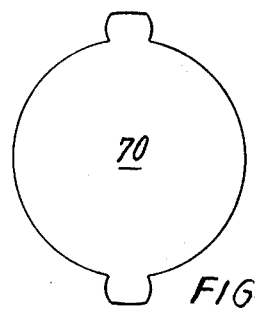
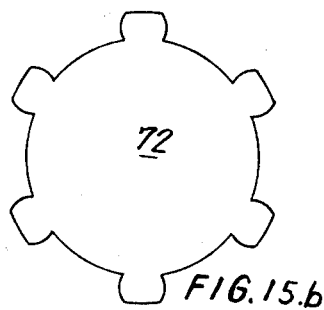
FIG.15.a.   FIG.15.b
  
FIG.16.a   FIG.16.b   FIG.16.c
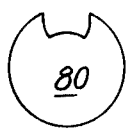  
FIG.17.a   FIG.17.b   FIG.17.c
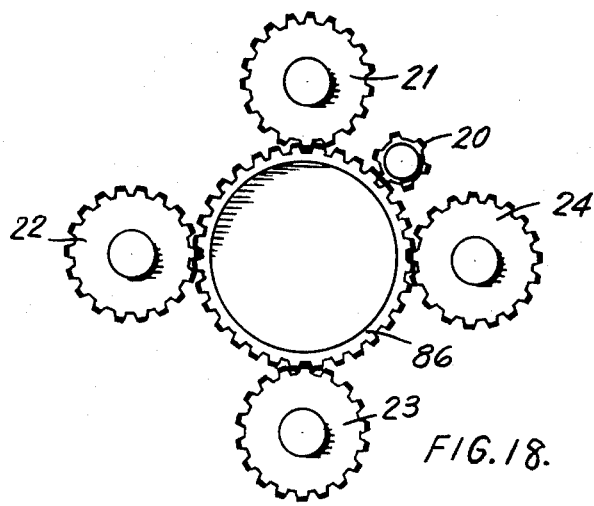
FIG.18.

INTERNAL COMBUSTION ENGINES

BACKGROUND OF THE INVENTION

The present invention relates to internal combustion engines.

As is well known, conventional internal combustion engines whether of the four-stroke or two-stroke type suffer from several drawbacks. Because of incomplete combustion taking place with such conventional engines there is an unavoidable discharge of gases which pollute the atmosphere unless special measures are taken to avoid such pollution. Moreover, such conventional engines are of a relatively low efficiency due to characteristics inherent in the operation thereof. Thus, such engines conventionally include pistons which reciprocate along their axes, with the requirement that the motion of the pistons be transmitted through relatively complex inefficient mechanisms to a rotary crankshaft. This straight-line travel of the pistons of conventional engines is inefficient because the piston must first move in one direction, and then come to a stop before moving in the opposite direction, and of course each reciprocating piston must provide continuous rotary movement of the crankshaft with the mechanism which transmits the motion of the piston to the crankshaft being undesirably stressed inasmuch as it is unavoidably subjected to pushing forces in one direction of movement of the piston and pulling forces in the opposite direction of movement of the piston. While attempts have been made to avoid the above problems as by retarding or advancing the firing in the combustion chambers of such conventional engines to increase the operating efficiency thereof and by connecting a flywheel to the rotary crankshaft to smooth out the rotary movement thereof, nevertheless the above problems have not been fully solved.

SUMMARY OF THE INVENTION

It is accordingly a primary object of the present invention to provide an internal combustion engine which will avoid the above problems.

In particular, it is an object of the present invention to provide an internal combustion engine which will operate far more efficiently than conventional engines of the above type so as to avoid discharge of incompletely burned gases to the outer atmosphere while at the same time achieving a power output for a given amount of fuel and for the size of the engine which is greater than that which can be achieved with the same amount of fuel in a conventional engine of the same size.

Moreover, it is an object of the present invention to provide an internal combustion engine which is far simpler and far more reliable in its operation than conventional engines.

The internal combustion engine of the invention includes a rotor means which has a central axis of rotation, an outer periphery extending along a circle whose center is in this axis, and at least one pair of diametrically opposed projections projecting radially from its outer periphery. A housing means houses the rotor means and has an inner periphery extending along a circle whose center is in the rotor axis while being in the same plane as and of a diameter larger than the circle along which the outer periphery of the rotor means extends, so that these peripheries define between themselves an annular channel. The projections have outer ends slidably and fluid-tightly engaging the inner periphery of the housing means so as to divide the channel into a plurality of channel portions. A fluid-control means is operatively connected with the housing means and communicates with the channel for controlling flow of combustible fluid into the channel and flow of exhaust gases out of the channel. A combustion-chamber means is connected with the housing means and communicates with the channel to receive combustible fluid from the channel and to release the fluid after combustion thereof into the channel for expansion therein while engaging first one and the other of the projections for driving the rotor means in rotation with respect to the housing means. In this way the combustible fluid, the exhaust gases, and the expanding gases of combustion are all compelled to flow circumferentially along the channel in the channel portions thereof defined between the projections.

BRIEF DESCRIPTION OF DRAWINGS

The invention is illustrated by way of example in the accompanying drawings which form part of this application and in which:

FIG. 5a is a schematic illustration of a rotor and a plurality of fluid-control and combustion-chamber means of the invention;

FIG. 5b illustrates the timing part of a drive means of the invention;

FIG. 5c illustrates that part of the drive means of the invention which is connected with the rotary members of the fluid-control and combustion-chamber means;

FIG. 6 illustrates the components of FIGS. 5a–5c assembled together;

FIG. 7 is a side elevation of the assembly of the components of FIG. 6;

FIG. 8 illustrates the structure of FIG. 6 with part of the housing means;

FIG. 9a shows the relationship between a timing gear and a transmission gear of the drive means;

FIG. 9b illustrates the relationship between a fluid-control means and a gear which drives the same;

FIG. 9c illustrates the relationship between the rotor and a lobed gear of the drive means;

FIG. 9d illustrates the relationship between a combustion chamber means and a gear which drives the same;

FIGS. 10a–10d are respectively side elevations of the structures shown in FIGS. 9a–9d, respectively;

FIG. 11 is a schematic illustration of the manner in which projections of the rotor means are constructed and cooperate with a combustion-chamber means and fluid-control means;

FIGS. 12a and 12b respectively illustrate front and rear walls of the housing means;

FIG. 13a is a side elevation of the housing means with the front wall of FIG. 12a joined thereto;

FIG. 13b is a side elevation of the rotor means and fluid-control and combustion-chamber means cooperating therewith;

FIG. 13c is a side elevation of the rear wall of the housing means;

FIG. 13d is a side elevation of the ring gear of the drive means;

FIG. 13e is a side elevation of a lobed gear and timing gear of the drive means;

FIG. 14 shows all of the components of FIGS. 13a–13e assembled together;

FIGS. 15a and 15b respectively illustrate different possible embodiments for the rotor means;

FIGS. 16a–16c respectively illustrate different possible embodiments for the combustion-chamber means;

FIGS. 17a–17c respectively illustrate different possible embodiments for the fluid-control means; and FIG. 18 is a schematic illustration of a different possible embodiment of a drive means of the invention.

DESCRIPTION OF PREFERRED EMBODIMENTS

Figure 1:
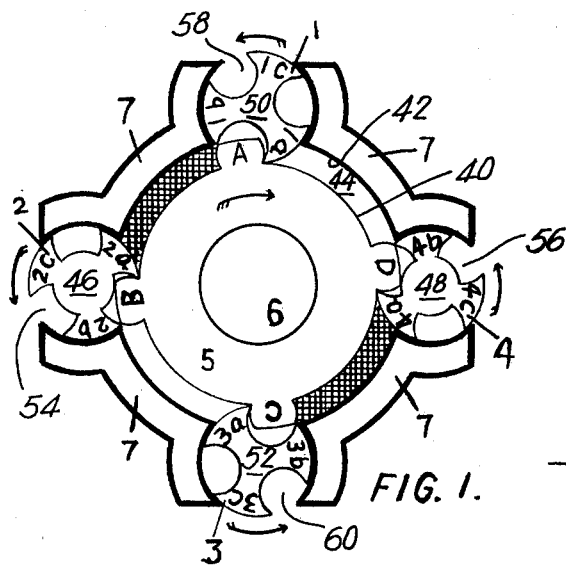
FIGS. 1–4 are respectively four schematic illustrations of the engine of the invention illustrating four successive stages in the operation thereof, respectively.

Referring first to FIGS. 1–4, wherein the principle of operation of the engine of the invention is illustrated, it will be seen that the engine includes a circular rotor means 5 which is fixed coaxially with an output shaft 6. This shaft 6 extends through and beyond the housing means 7, as will be apparent from the description which follows. The rotor means 5 has an outer periphery 40 extending along a circle whose center is in the axis of the rotor means 5. The housing means 7 has an inner circular periphery 42 of a larger diameter than the periphery 40 and coaxial therewith, so that the outer periphery 40 of the rotor means 5 and the inner periphery 42 of the housing means 7 define between themselves an elongated circular channel 44.

The stationary housing means 7 has operatively connected therewith in the example of FIGS. 1–4 a pair of diametrically opposed fluid-control means 2 and 4, this housing means also having operatively connected thereto a pair of diametrically opposed combustion-chamber means 1 and 3 in the illustrated example. The pair of combustion-chamber means 1 and 3 alternate with the pair of fluid-control means 2 and 4, and these means are equidistantly arranged at angles of 90° from one to the next about the axis of the output shaft 6. Each of these means 1–4 is formed by a rotary sealing means which includes a rotary member in fluid-tight but slidable engagement with the housing means 7 in the manner illustrated in FIG. 1.

The rotor means 5 has in the illustrated example four projections A, B, C, and D, which are equidistantly spaced from each other about the axis of the rotor means as illustrated. Each of the projections A–D has an outer surface which has a fluid-tight sliding engagement with the inner periphery 42 of the housing means 7 during rotation of the rotor means 5 with respect to the housing means 7, this rotation being in a clockwise direction in the illustrated example, as illustrated by the arrows of FIGS. 1–4.

It will be seen that the rotary members 46, 48 which respectively form the fluid-control means 2 and 4 project inwardly beyond the inner periphery 42 of the housing means 7 and are in fluid-tight engagement with the outer periphery 40 of the rotor means 5. In the same way the pair of rotary members 50 and 52 which respectively form the pair of combustion-chamber means 1 and 3 extend inwardly beyond the inner periphery 42 of the housing means 7 and have a fluid-tight engagement with the outer periphery 40 of the rotor means 5. It is to be noted that the engagement between the rotary members 46, 48, 50, and 52 with the outer periphery 40 of the rotor means 5 is one of substantially pure rolling contact. In the illustrated example the rotary member 46 is formed with three equidistantly spaced pockets 54 which successively receive the projections A–D during operation of the illustrated engine, and in the same way the rotary member 48 is formed with equidistantly spaced pockets 56 for the same purpose. It will be noted that the inner surfaces of the pockets 54 and 56 are convex and extend along circles, the centers of which are in the axes of rotation of the member 46 and 48. In the same way, the rotary members 50 and 52 are respectively formed with pockets 58 and 60, each of these rotary members having three of these pockets in the illustrated example, but in this case it will be seen that the inner edges of these pockets 58 and 60 are concave so that the pockets 58 and 60 are capable of forming combustion chambers with the projections A–D as will be apparent from the description which follows.

Figure 2:
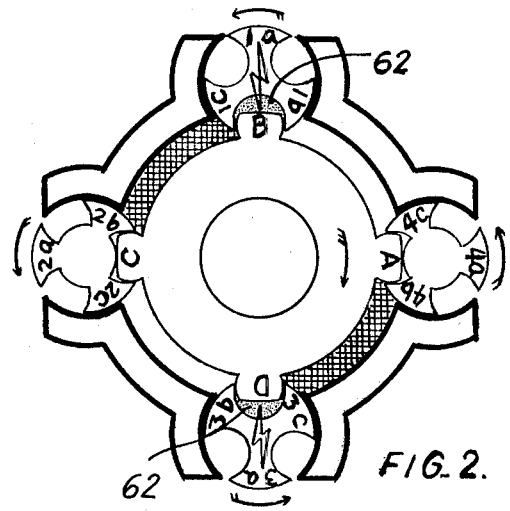
Figure 4:
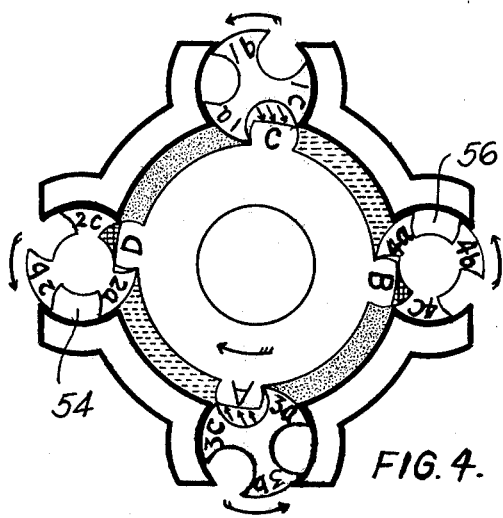

By way of a drive means which is described below, the several means 1–4 are rotated in counterclockwise directions, as illustrated in FIGS. 1–4 while the rotor means 5 simultaneously rotates in a clockwise direction, and the timing provided by way of the drive means is such that the projections A–D will be received in the several pockets of the several means 1–4 while the latter rotate in the manner illustrated. In a manner which is described in greater detail below, each fluid-control means 2 and 4 serves to provide for the intake of a combustible fluid and the discharge of exhaust gases while each of the combustion-chamber means 1 and 3 serves to form with each of its pockets and each projection A–D a combustion chamber 62 as illustrated in FIG. 2. When the parts have the position shown in FIG. 2 the combustible mixture in each combustion chamber 62 is ignited in a manner described below.

Figure 3:
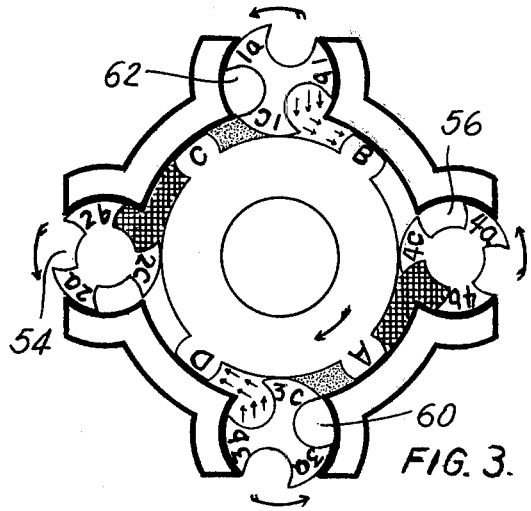

With respect to the principle of operation of the structure of the invention, it will be seen that just before the parts have reached the position shown in FIG. 1, intake of a combustible fluid has been provided by way of the pair of fluid-control means 2 and 4 so that the combustible fluid is situated in those portions of the channel 44 situated at the upper left and lower right of FIG. 1 on the one hand between the projections B and A and on the other hand between the projections D and C. When the parts have reached the position of FIG. 2, the combustible fluid shown in FIG. 1 has become situated in the pair of combustion chambers 62, compressed therein, while a new charge of combustible fluid has been received in the upper left and lower right channel portions shown in FIG. 2, ready to be received in the next combustion chambers which will be formed during continued operation of the engine. While the parts continue to rotate beyond the position shown in FIG. 2, the mixtures in the chambers 62 shown in FIG. 2 which have been ignited expand so as to drive the projections B and D in the manner illustrated in FIG. 3. It will be seen from FIG. 3 that while the lobe 1c of the rotary combustion-chamber means 1 is in rolling contact with the outer periphery 44 of the rotor means 5, the mixture taken in at the stage of the operation shown in FIG. 2 is being compressed and is about to be received in the pocket 62 situated between the lobes 1c and 1a of the means 1 in the position of the parts shown in FIG. 3. At the same time a new combustible mixture has been received through the pocket of the means 2 between the lobes 2b and 2c thereof, and this new charge follows the projection C of FIG. 3 as the latter projection approaches the rotary combustion-chamber means 1 of FIG. 3. In the same way, a new charge received in the pocket between the lobes 4b and 4c of FIG. 3 follows the projection A while this projection compresses the previously received charge which is about to be admitted into the pocket 60 between the lobes 3c and 3a of the combustion-chamber means 3 in FIG. 3. The expanding previously ignited gases continue to drive the projections B and D beyond the position thereof shown in FIG. 3, and at the time the parts reach the position shown in FIG. 4 these expanding gases from exhaust gases which are about to be discharged through the pocket 54 formed between the lobes 2a and 2b of the means 2 when the latter turns beyond the position shown in FIG. 4. In the same way, the gases expanding beyond the means 1 in FIG. 3 form in FIG. 4 exhaust gases about to be received in the pocket 56 defined between the lobes 4a and 4b of the fluidcontrol means 4 shown in FIG. 4. The charge of combustible mixture which follows the projection A in FIG. 3 is about to be compressed by the projection B in FIG. 4, and simultaneously at the diametrically opposed part of the engine the charge entering in FIG. 3 behind the projection C is about to be compressed by the projection D in FIG. 4. Each of the pockets 54 and 56 during the initial part of its communication with the channel 44 serves to discharge exhaust gases and during the final part of its communication with the channel 44 serves to introduce a new charge. The rotor means 5 has turned to 180° when progressing from the position of FIG. 1 to the position of FIG. 4, and during this one-half revolution of the rotor means, each of the projections A-D has progressed through an entire cycle of operations with each of these cycles including the equivalent of intake, compression, power and exhaust phases in conventional internal combustion engines. Thus, considering the projection B in FIG. 1, it will be seen that intake has just been completed in front of projection B in FIG. 1, and while the projection B turns to 90° from the position of FIG. 1 to the position of FIG. 2, compression has taken place and the compressed charge is situated in the combustion chamber 62 of FIG. 2 to be ignited and perform the power or expansion phase shown in FIG. 3 during which the expanding previously ignited gases drive the projection B toward the fluid-control means 4 of form 3. While the projection B turns from the position shown in FIG. 2 through the position shown in FIG. 3 to the position shown in FIG. 4, it is driven on one side by the expanding gases, as shown in FIG. 3 while at its opposite side the projection B serves to exhaust the previously expanded gases so that a complete cycle of operations, has been completed by the projection B when it has progressed from the position the fluid-control means to the position of FIG. 4, and now a further complete cycle of operations will be performed as this projection B progresses through the next 180° beyond the position shown in FIG. 4 until the projection B again reaches the position shown in FIG. 1. Of course, these same operations take place for each of the projections A-D, so that in the illustrated example during each complete revolution of the rotor means 5 each of the four projections A-D goes through two complete operating cycles, so that during each revolution of the rotor means 5 there are in fact eight power phases of each cycle, two of which take place simultaneously at diammetrically opposed projections for simultaneously driving the rotor means 5 at diametrically opposed parts thereof in a balanced manner, and of course two intakes, two compressions and two exhaust phases also take place simultaneously during each operating cycle with two complete cycles being performed for each projection during each revolution of the rotor means 5, as pointed out above.

FIG. 5a schematically illustrates arrangement of the rotor means 5 together with the several means 1-4, with FIG. 5a illustrating the shafts 11-14 which are respectively fixed to the means 1-4 in order to rotate the latter. These shafts 11-14 respectively form parts of a drive means for driving the several means 1-4 in proper synchronism with respect to the rotor means 5, as described below.

FIG. 5b shows further parts of the drive means. Thus FIG. 5b shows a lobed gear 18 which is fixed to the output shaft 6 outwardly beyond the housing means 7, this lobed gear 18 having four lobes as illustrated in FIG. 5b, with each of these lobes extending through 90° about the axis of the output shaft 6 as is apparent from FIG. 5b. An eccentric gear 19 meshes with the lobed gear 18, and this eccentric gear 19 is fixed to an eccentric shaft 10 which as illustrated is eccentrically fixed to the eccentric gear 19. Thus, while the lobed gear 18 turns in a clockwise direction, as viewed in FIG. 5b, with the shaft 6, the eccentric gear 19 will turn in a counterclockwise direction, remaining in mesh with the teeth of the gear 18 and rolling along the lobes thereof with the intersections between the lobes receiving the part of the gear 19 most distant from its axis of rotation, so that in this way, for a purpose referred to below, the gear 19 will have its fastest speed of rotation in the position shown in FIG. 5b and its slowest speed of rotation when the outermost part of the gear 19 is received at a point midway between a pair of lobes, so that in this way the part of the drive means shown in FIG. 5b is capable of producing a variable output speed at the shaft 10 with this output speed being at a maximum when the parts have the position shown in FIG. 5b where the gear 19 is at a crest of a lobe while being at a minimum when the gear 18 has turned through 45° beyond the position shown in FIG. 5b.

FIG. 5c shows the several shafts 11-14 which are respectively fixed to the several means 1-4 as described above. However, in FIG. 5c these shafts are shown respectively fixed to the gears 21-24 which serve to drive the shafts 11-14 and thus rotate the several means 1-4. These gears 21-24 all mesh with the teeth of an internal ring gear 17 which coaxially surrounds the shaft 6 as will be apparent from the description which follows. Also in mesh with the teeth of the internal ring gear 17 is a timing gear 20 which is driven by the eccentric shaft 10.

The components of FIGS. 5a-5c are shown assembled together in FIG. 6, and these components are illustrated in a side elevation in FIG. 7. It will be seen that by way of the drive means of the invention illustrated in FIGS. 5b, 5c, 6 and 7, while the shaft 6 rotates at a constant speed together with the rotary means 5, the several means 1-4 are rotated each at a variable speed with this speed being at a maximum as the eccentric gear 19 is driven by the crest of a lobe of the gear 18 and at a minimum when the eccentric gear 19 is situated between a pair of lobes. As is apparent from FIG. 6, the parts are shown therein in the same position as illustrated in FIG. 5b and 5c, so that it is clear that when any of the projections A-D are received in a pocket of the means 1-4 or are in the vicinity of a pocket, these projections are rotating at a maximum speed while as each projection turns beyond the pocket of one of the means 1-4 the speed of rotation of each projection A-D gradually diminishes with this speed then gradually increasing as each projection A-D approaches the next means 1-4. In this way while there is a rapid speed of rotation during the time that the projections are respectively received in and in the vicinity of the pockets, there is a first diminishing and then an increasing speed of rotation which affords sufficient time for the gases which have been ignited to expand from the combustion chambers to produce the power phases of each operating cycle.

FIGS. 9a and 10a respectively show in front and side elevations the assembly of the eccentric gear 19 and the timing gear 20 with the shaft 10. As is apparent from FIG. 10a, the shaft 10 extends forwardly through a considerable distance from the timing gear 20. This relationship is also shown in FIG. 7. Thus the shaft 10 can extend into the housing means to be supported for rotary movement by bearings thereof.

FIGS. 9b and 10b respectively illustrate front and side elevations of the rotary fluid-controlled means 4 together with the shaft 14 fixedly carrying the same and the drive gear 24 which rotates the shaft 14 and the means 4. In this case also it will be noted from FIG. 10b that the shaft 14 extends forwardly beyond the rotary fluid-controlled means 4 so that the shaft 14 can be received at its front end in a bearing of the housing means.

FIGS. 9c and 10c respectively show front and side elevations of the lobed gear 18 together with the output shafts 6 on which the lobed gear 18 is fixed and together with the rotor means 5. The angular relationship between the rotor means 5 and the gear 18 is particularly apparent from FIG. 9c. Bearing in mind that the eccentric gear 19 has with respect to the lobed gear 18 the relationship indicated in FIG. 5b, it is clear from FIG. 9c that when the eccentric gear is situated between a pair of lobes providing the smallest speed of rotation the rotor means 5 has turned 45° beyond the position shown in FIG. 9c, so that the several projections A-D are substantially midway between the opposed pair of fluid-control means and the opposed pair of combustion-chamber means.

FIGS. 9d and 10d respectively show front and side elevations of the combustion chamber means 3 together with the shaft 13 fixedly carrying the same and the gear 23 which is fixed to the shaft 13. In this case also it will be noted that the shaft 13 extends forwardly beyond the means 3 so as to be received in a suitable bearing of the housing means. It is of course to be understood that the unillustrated fluid-control means 2 as well as the shaft 12 and the drive gear 22 are respectively identical with the fluid-control means 4, the shaft 14 and the gear 24 shown in FIGS. 9b and 10b. In the same way, the unillustrated combustion-chamber means 1, together with the shaft 11 and the drive gear 21 are substantially identical with the components 3, 13, 23, described above and shown in FIGS. 9d and 10d.

FIG. 11 is a fragmentary illustration of the rotor means 5 and a pair of the projections fixed thereto, namely the projections A and B in the case of FIG. 11, these projections being shown in their cooperative relationship with the fluid-control means 4 and combustion-chamber means 1. As is apparent from FIG. 11, each combustion-chamber means and fluid-control means has an outer periphery at its lobes extending along a circle which is tangent to the outer periphery of the rotor means 5. Each of the projections, A and B of which are shown in FIG. 11, is in fact part of a shaft of circular cross-section, as shown in dotted lines for the projection B in FIG. 11. Such a shaft may be considered as extending into the body of the rotor 5 to an extent approximately equal to one-quarter of the diameter of the shaft, as is apparent from the dotted line illustration in connection with the projection B in FIG. 11. Moreover, the inner periphery 42 of the housing means, shown in dotted lines in FIG. 11, may be considered as continuing across the outer ends of these shafts which form the projections A–D, so that in this way the outer end surfaces of the several projections are determined. Each of the projections A–D has front and rear end surfaces situated in the same plane as and forming continuations of the front and rear surfaces of the rotor means 5, these surfaces of course being situated in planes normal to the axis of the rotor means 5 which of course coincides with the axis of the output shaft 6. Thus, referring to FIG. 10c it will be seen that the projections A, B, and D, and of course the projection C which is not visible in FIG. 10c, have this relationship with respect to the rotor means 5.

Referring now to FIG. 12a, the front wall 8 of the housing means is illustrated therein. This front wall has a substantially central opening 32 through which the output shaft 6 extends, a suitable bearing 29 being provided for the shaft 6 at the front wall 8 of the housing means. The front wall 8 is shown carrying above and below the bearing 29 a pair of spark-plug means 15 and 16 which are energized at the proper instants for igniting the combustible mixtures in the combustion chambers 62 when the rotor means 5 has the position shown in FIG. 2, and of course at each quarter-revolution of the rotor means subsequent to the position thereof shown in FIG. 2. Thus, for each revolution of the rotor means there will be eight ignitions of the combustible mixtures with two of these ignitions taking place simultaneously as illustrated in FIG. 2. Above and below the spark-plug means 15 and 16 the front wall 8 is formed with bores 33 for respectively receiving the front ends of the shafts 11 and 13 which also may be supported at these bores for rotation in suitable bearings, these shafts of course carrying the pair of combustion-chamber means 1 and 3, as set forth above.

Just to the left of the bearing 29 in FIG. 12a there are illustrated an intake means 25 and an exhaust means 28 for respectively supplying combustible mixture to the channel 44 and discharging gases therefrom. As is apparent from FIG. 12a, the intake duct 25 is situated above the exhaust duct 28. Thus, as may be seen from FIG. 1, as each pocket 54 rotates into, along, and out of the channel 44, it will first serve to exhaust gases from the channel portion at the lower left of the housing means 7, as viewed in FIGS. 1–4, and then it will serve to admit a new charge of combustible fluid into the upper left portion of the channel 44, as viewed in FIGS. 1–4.

In the same way, an intake means 26 and an exhaust means 27 are shown at the right of the bearing 29 in FIG. 12a, and the intake means 26 and exhaust means 27 cooperate with each pocket 56 of the fluid-control means 4 in order respectively to exhaust gases from the upper right portion of the channel 44, as viewed in FIGS. 1–4, and to admit a new charge into the lower right portion of the channel 44, as viewed in FIGS. 1–4.

Finally, it will be seen that outwardly of these intake and exhaust ducts there are a pair of bores 34 formed in the front housing wall 8 for respectively receiving the front ends of the shafts 12 and 14 which carry the pair of fluid-control means 2 and 4, these openings 34 also having suitable bearings for the front ends of these shafts.

FIG. 12b illustrates the rear housing wall of the housing means, this rear housing wall 19 also being formed with a central opening 32 which is surrounded by a bearing 30, the output shaft 6 extending through this opening 32 and also being supported by the bearing 30 at the rear wall 9 for rotary movement.

The upper and lower bores 33 shown in FIG. 12b are of course aligned with the corresponding bores 33 of FIG. 12a, and these bores shown above and below the bearing 30 in FIG. 12b respectively have the shafts 11 and 13 passing therethrough, this rear wall 9 being situated between each combustion chamber means 1 and 3 and the gears 21 and 23 which drive the shafts 11 and 13. Thus, the gears 21 and 23 are situated outwardly beyond the wall 9 shown in FIG. 12b. In this case also suitable bearings may be situated in the openings 33 of FIG. 12b. In the same way, the openings 34 receive portions of the shafts 12 and 14 which extend between the fluid-control means 2 and 4 and the gears 22 and 24 which drive the shafts 12 and 14. Of course, when the components are assembled the rear wall 9 of the housing means is fixed to the intermediate portion 7 thereof before the drive gears 21–24 are respectively fixed to the shafts 11–14, respectively.

FIG. 13a shows how the front wall 8 and the intermediate housing portion 7 are assembled together with FIG. 13a also showing the location of the central opening 32. Thus, the front wall 8 is shown in a side view as seen from the right of FIG. 12a. FIG. 13a shows schematically several bearings 31 which are situated in the several openings 33 and 34. With the parts assembled as indicated in FIG. 13a, the shaft 6 together with the rotor means 5 fixed thereto can be slipped into the housing portion 7, 8 illustrated in FIG. 13a, and of course the several means 1–4 and the shafts 11–14 respectively carrying the same can also be slipped into the part of the housing means illustrated in FIG. 13a.

Thus, FIG. 13b shows the structure assembled with the housing structure shown in FIG. 13a, at this particular stage of the assembly of the components. It is to be noted that at this time the shaft 10 has not yet been assembled with these components although it is illustrated in FIG. 13b to show its relationship with respect to the other components.

At this part of the assembly the rear wall 9 is slipped onto the output shaft 6 and joined to the rear surface of the housing portion 7. The rear wall 9 is shown in FIG. 13c by itself in a side view as seen from the right of FIG. 12b. FIG. 13c also illustrates schematically the opening 32 as well as the bearings 30 and 31 for the several rotary shafts.

Once the rear wall of the housing means has thus been assembled with the other components, the several drive gears 21–24 are mounted on the several shafts 11–14 where they project rearwardly from the wall 9, and the ring gear 17 is then situated on the several gears 21–24, so that the internal teeth of this ring gear 17 compel all of the gears 21–24 to have a predetermined relative rotation with respect to each other. In other words all of these gears 21–24 will be uniformly turned in the sense that each of these gears is rotating in the same way as each of the other gears even though the speed of each gear is variable. Thus all of the gears 21–24 will be compelled to increase and decrease their speed in synchronism. FIG. 13d shows the ring gear 17 in a side elevation, and the several drive gears 21–24 are not visible in FIG. 13d inasmuch as they are of the same thickness as the ring gear 17 and situated in the same plane as the gear 17.

At this time the lobed gear 18 is fixed to the shaft 6, and of course care is taken to angularly align the minimum radii portions of the lobed gear 18 with the projections A–D so as to have the relationship indicated in FIG. 9c. When the lobed gear 18 has this particular relationship with respect to the rotor means 5, the lobed gear 18 is rigidly fixed with the shaft 6 so that this angular relationship is maintained. It is to be noted that this particular relationship is not at all difficult to maintain inasmuch as a simple key may be fixed to the shaft 6 and received in a keyway formed at the inner periphery of the rotary means 5, while a similar key may be fixed to the shaft 6 and situated in a suitable keyway in the central bore of the lobed gear 18, and simply by properly positioning these keys and keyways it is possible to assure the proper angular relationship between the rotary means 5 and lobed gear 18 as illustrated in FIG. 9c.

With the parts thus assembled the eccentric gear 19 is placed in mesh with the lobed gear 18 while the shaft 10 is advanced into the bearings 31 carried by the bores 35, and of course the timing gear 20 will move into mesh with the internal teeth of the ring gear 17. Thus, when all of the parts are assembled they will have the relationship indicated in FIG. 14.

Of course, the construction of the engine of the invention has only been set forth in its more important aspects above. It will be clear to those skilled in the art that the front and rear walls of the housing means are fixed to the intermediate portion 7 thereof through suitable fasteners with suitable sealing gaskets or the like situated between the front and the rear walls and the intermediate portion 7, while a suitable lubricant will form a film between the front and rear surfaces of the rotor means 5 as well as the several means 1–4, and the corresponding surfaces of the walls 8 and 9 against which these front and rear surfaces slide. The structure for supplying such lubricant is not illustrated. In addition, the gear 17 is maintained in the position meshing with the several drive gears 24 through suitable fingers or the like such as a suitable fork member projecting from a housing portion which is not illustrated but which houses the several gears shown to the right of the wall 9 in FIG. 14 and this unillustrated housing portion will of course be provided with a supply of lubricant for lubricating the various gears. Also an unillustrated distributor will be connected to the spark-plug means 15 and 16 for energizing the latter at the proper times. The intake ducts 25 and 26 will of course communicate through a suitable carburetor system or the like with a structure which will provide a suitable combustible mixture to be sucked into the upper left and lower right portions of the channel 44, as viewed in FIG. 3, while the projections travel along these portions of the channel 44, as shown for the projections A and C in FIG. 3.

As is apparent from the above description, an exceedingly effective smooth drive for the shaft 6 will be achieved. The rotor means 5 will not only have a flywheel effect, but in addition at each quarter revolution of the shaft 6 and the rotor means 5 there is a driving force provided simultaneously at diammetrically opposed projections by the expanding gases, so that an exceedingly effective balanced drive is achieved resulting not only in high efficiency but in an extremely smooth operation. Moreover, it will be seen that all of the components rotate at all times in only one direction so that the stresses and strains encountered in conventional engines and resulting from reciprocating parts are avoided. As was pointed out above in connection with FIG. 11, the several projections A-D are in fact parts of shafts of circular section, and the configuration of the pockets of the several means 1-4 are such that the projections enter smoothly into and out of these pockets while achieving the required seals due to rolling contact between the components. Because of this rolling contact there is a minimum of sliding friction. The only sliding friction is between the front and rear surfaces of the rotor means 5 and the projections A-d as well as the several rotary means 1-4 together with the corresponding surfaces of the front and rear walls of the housing means, and of course there is a sliding friction between the outer end surfaces of the projections and the inner periphery of the housing portion 7. At the exterior parts of the housing means 7-9 where this sliding friction occurs it is easily possible to situate water jackets and to circulate cooling water therethrough. However, by choice of suitable materials and exposure of the housing means to the outer atmosphere with the suitable lubricant at these sliding surfaces such positive cooling is not required.

As was pointed out above, since there are eight ignitions of the combustible mixtures taking place at each revolution, with two of these ignitions taking place simultaneously, there are in fact what amounts to the equivalent of four strokes of a conventional engine taking place at each revolution of the rotor means 5, and this operation results in a saving of approximately 30 percent of fuel, lower air pollution, and a requirement of only 1/6 of the displaced volume of a conventional four-stroke piston engine in the case where a conventional four-stroke piston engine produces the same power as the engine of the invention. The energy resulting from the combustion of the mixtures in the engine of the invention is fully absorbed and utilized. It is to be noted that the four power impulses provided during each revolution of the above-described engine of the invention is to be compared with a four-stroke conventional engine where one power stroke occurs only at each second revolution of the crank shaft for each piston of such an engine.

Through suitable calculations it is possible to demonstrate that the engine of the present invention will produce 1.5 times the work of a conventional piston engine at each power impulse of the present invention corresponding to a power stroke of a conventional engine. Since there are four such power pulses at each revolution of the engine of the invention, it follows that with the engine of the invention it is possible to produce four times 1.5 or six times the work of a conventional engine if both have corresponding volumes for the gases. In other words with the engine of the invention it is possible to save approximately 30 percent of the fuel with only 1/6 of the displaced volume of a four-stroke conventional engine which produces the same power. Moreover it will be seen that with the engine of the invention almost 100 percent of the exhaust gases are discharged so as to provide intake and power phases at each operating cycle which have an extremely high efficiency.

The engine of the invention can operate with many different types of fuel, including gasoline, propane gas, etc. It is to be noted that the gases with the structure of the invention are required to travel substantially only along a continuous circular path around the axis of the rotor means, as contrasted with the straight line intake, compression, power, and exhaust strokes of a conventional engine.

It is to be noted that while there are four projections A-D for the rotor means 5 in the illustrated example, each of the means 1-4 has only three pockets. Thus, the variable speed cycle from fast to slow and again to fast for each of the means 1-4 takes place during a third of a revolution of each of these means. During each third of a revolution of each of the means 1-4 the rotor means 5 turns through 1/4 of a revolution at a constant speed. Thus, the lobed gear 18 has four times the number of teeth at the eccentric gear 19 while each of the gears 21-24 has three times the number of teeth of the timing gear 20.

Of course, it will be understood that any suitable starting motor may be connected to the shaft 6 to start the operation of the engine with the drive from the starting motor being disconnected when the engine of the invention has started to operate and continues to operate by itself. Such features are of course well known.

Moreover, many variations are possible in the structure of the invention. For example, FIGS. 15a and 15b respectively illustrate rotors 70 and 72 which respectively have only two and as much as six projections. Furthermore, the several rotary combustion means need have only one pocket, or may have only two pockets, or may have as much as four pockets, as respectively illustrated for the rotary combustion means 74, 76, and 78 in FIGS. 16a, 16b, and 16c, respectively.

In the same way, the several fluid-control means may have only one pocket, or only two pockets, or even four pockets, as illustrated for the several fluid-control means 80, 82, and 84 in FIGS. 17a, 17b, and 17c, respectively.

In addition, instead of using a ring gear 17 having internal teeth, it is possible to place around the shaft 6 a ring gear 86, as shown in FIG. 18, having external teeth meshing with the several drive gears 21-24 and the timing gear 20. In this case, the eccentric gear 19 would be the same as described above, and the lobed gear 18 would be the same except that the lobes thereof would be situated closer to the shaft 6 with such a construction, in other words, the lobed gear will still have the same number of teeth as in the example described above.

It is therefore apparent that many variations are possible without departing from the invention.

What is claimed is:

1. In an internal combustion engine, rotor means having a central axis of rotation, an outer periphery extending along a circle whose center is in said axis, and at least one pair of diametrically opposed projections projecting radially from said periphery, housing means housing said rotor means and having an inner periphery extending along a circle whose center is in said axis and being in the same plane as and of a diameter larger than the circle along which said outer periphery of said rotor means extends so that said peripheries define between themselves an annular channel, said projections having outer ends slidably and fluid-tightly engaging the inner periphery of said housing means for dividing said channel into a plurality of channel portions, fluid-control means operatively connected with said housing means and communicating with said channel for controlling flow of combustible fluid into said channel and flow of exhaust gases out of said channel, and combustion-chamber means connected with said housing means and communicating with said channel for receiving combustible fluid from said channel and for releasing the fluid after combustion thereof into said channel for expansion therein while engaging first one and then the other of said projections for driving said rotor means in rotation with respect to said housing means, whereby the combustible fluid, the exhaust gases, and the expanding gases of combustion are all compelled to flow circumferentially along said channel in said channel portions thereof defined between said projections, said fluid-control means and said combustion-chamber means are each in the form of a rotary sealing means capable of rotating with respect to said housing means while having a sealed, fluid-tight engagement therewith, each rotary seal means including a rotary member extending into said channel and having a fluid-tight engagement with said outer periphery of said rotor means between said projections thereof, each rotary member being formed with at least one pocket for receiving each projection as it turns past each rotary member, and drive means extending between and operatively connected with said rotor means, on the one hand, and the rotary members, on the other hand, for rotating the latter in timed relation with respect to said rotor means for situating said pocket of each rotary member at an angular position for receiving each projection as it travels past each rotary member and wherein said rotor means rotates at a substantially constant speed while said drive means drives said rotary members at a variable speed which is at a maximum when each projection is in the vicinity of and travels past a rotary member and which becomes gradually smaller and then increases as each projection travels away from one rotary member and approaches the next rotary member, respectively, and wherein an output shaft is fixed to said rotor means for rotation therewith and extends therefrom outwardly beyond said housing means, said output shaft forming part of said drive means, and said drive means further including a lobed gear fixed to said output shaft and having at least one lobe, an eccentric gear meshing with said lobed gear to be driven thereby, an eccentric shaft fixed eccentrically to said eccentric gear and extending therefrom, a further gear fixed to said eccentric shaft for rotation therewith, an ring gear surrounding said output shaft and meshing with said further gear, and a pair of gears fixed coaxially to said rotary members and meshing with said ring gear, so that through said gears of said drive means said rotary members are rotated in timed relation with said rotor means while said lobed gear provides the variable speed of rotation for said rotary members.

2. The combination of claim 1 and wherein the rotary member of said combustion-chamber means defines a combustion chamber with each projection of said rotor means when each projection is in said pocket of said rotary member of said combustion-chamber means, and spark-plug means carried by said housing means and communicating with said combustion chamber for igniting combustible fluid therein.

3. The combination of claim 1 and wherein intake and exhaust conduit means are connected to said housing means and communicate with said rotary member of said fluid-control means for respectively supplying a combustible fluid to said channel and receiving exhaust gases therefrom during rotation of said latter rotary member through different angular increments, respectively.

4. The combination of claim 1 and wherein said rotor means has four of said projections equidistantly distributed circumferentially about said outer periphery of said rotary means, and a pair of said fluid-control means and a pair of said combustion-chamber means being respectively connected operatively with said housing means and communicating with said channel, said pair of fluid-control means being diametrically opposed and said pair of combustion-chamber means also being diametrically opposed and respectively alternating with said pair of fluid-control means circumferentially along said channel means.

5. The combination of claim 4 and wherein said lobed gear has four lobes, and four gears respectively fixed coaxially to said pair of fluid control means and said pair of combustion-chamber means and all meshing with said ring gear.

6. The combination of claim 5 and wherein said ring gear is an internal ring gear.

7. The combination of claim 5 and wherein said ring gear is an external ring gear.

* * * * *